(12) United States Patent
Goto

(10) Patent No.: US 8,466,969 B2
(45) Date of Patent: Jun. 18, 2013

(54) IMAGING APPARATUS AND SHAKE CORRECTING METHOD

(75) Inventor: Kenji Goto, Tokyo (JP)

(73) Assignee: Sony Corporation (JP)

( * ) Notice: Subject to any disclaimer, the term of this patent is extended or adjusted under 35 U.S.C. 154(b) by 353 days.

(21) Appl. No.: 12/799,812

(22) Filed: Apr. 30, 2010

(65) Prior Publication Data

US 2010/0295956 A1 Nov. 25, 2010

(30) Foreign Application Priority Data

May 25, 2009 (JP) .............................. P2009-125062

(51) Int. Cl.
*H04N 5/228* (2006.01)
*H04N 5/217* (2011.01)
*G06K 9/40* (2006.01)

(52) U.S. Cl.
USPC ...................... 348/208.12; 348/241; 382/275

(58) Field of Classification Search
None
See application file for complete search history.

(56) References Cited

U.S. PATENT DOCUMENTS

| 5,184,216 A | * | 2/1993 | Kobayashi | 348/207.99 |
| 2002/0075389 A1 | * | 6/2002 | Seeger et al. | 348/222 |
| 2003/0025798 A1 | * | 2/2003 | Grosvenor et al. | 348/207.99 |
| 2005/0157949 A1 | * | 7/2005 | Aiso et al. | 382/299 |
| 2007/0252905 A1 | * | 11/2007 | Kamiya et al. | 348/241 |
| 2010/0165104 A1 | * | 7/2010 | Fujita et al. | 348/148 |

FOREIGN PATENT DOCUMENTS

| JP | 06-237411 A | 8/1994 |
| JP | 06-237412 A | 8/1994 |
| JP | 07-177419 A | 7/1995 |
| JP | 2005-345520 A | 12/2005 |
| JP | 2007-228154 A | 9/2007 |
| WO | WO2007111377 | * 10/2007 |

\* cited by examiner

*Primary Examiner* — Albert Cutler
(74) *Attorney, Agent, or Firm* — Lerner, David, Littenberg, Krumholz & Mentlik, LLP

(57) ABSTRACT

An imaging apparatus includes: an imaging unit that generates an image signal of a picked up image by performing photoelectric conversion for an optical image formed by an imaging optical system; a shake detecting unit that detects a shake; a correction amount setting unit that sets a shake correction amount used for correcting the shake based on the shake detected by the shake detecting unit; and a correction processing unit that performs correction of distortion aberration generated by the imaging optical system for the picked up image, movement of an extraction area for an image in which the distortion aberration is corrected in accordance with the shake correction amount, and extraction of an image of the extraction area.

4 Claims, 13 Drawing Sheets

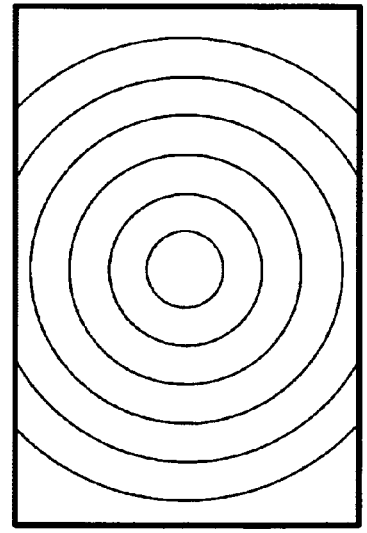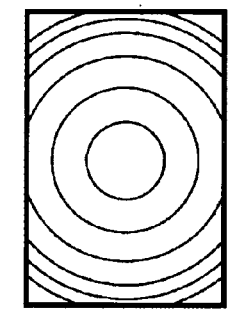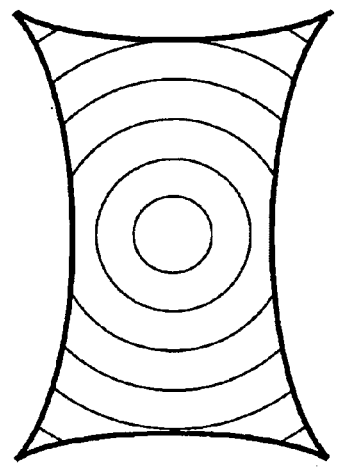

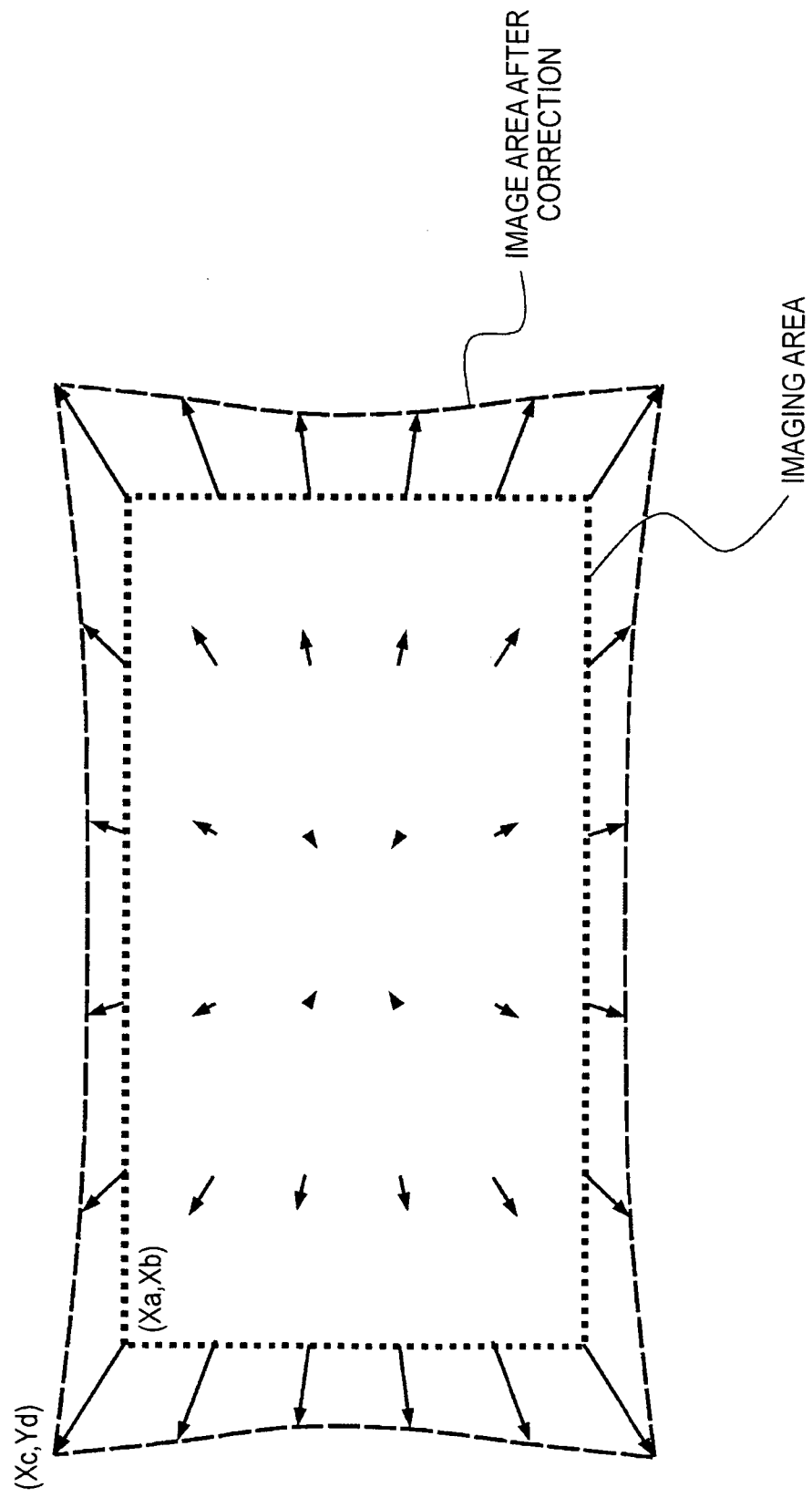

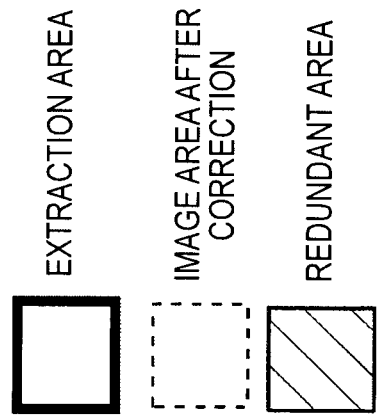
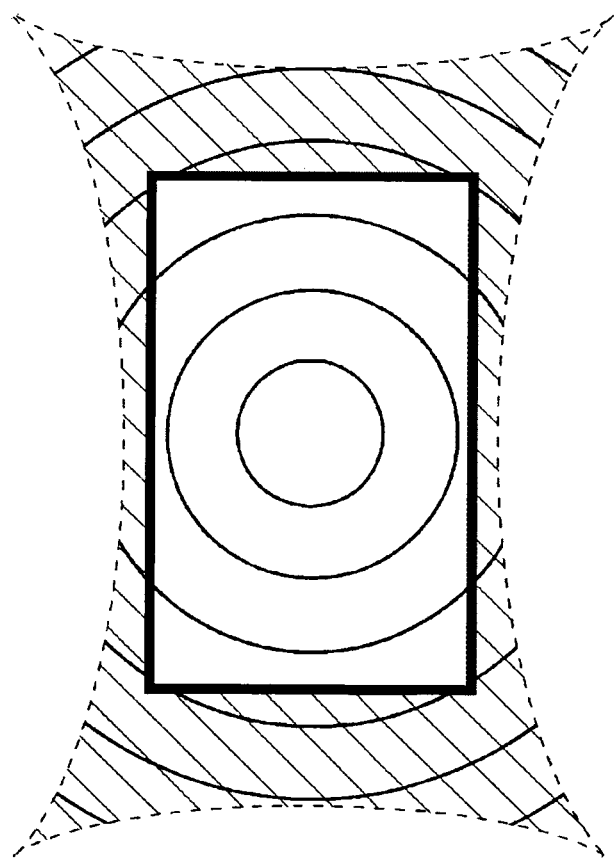
FIG.4

IMAGING AREA
IMAGE AREA AFTER CORRECTION

EXTRACTION AREA
IMAGE AREA AFTER CORRECTION

IMAGING AREA    IMAGE AREA AFTER CORRECTION

EXTRACTION AREA    IMAGE AREA AFTER CORRECTION

IMAGING APPARATUS AND SHAKE CORRECTING METHOD

CROSS-REFERENCE TO RELATED APPLICATION

The present application claims priority from Japanese Patent Application No. JP 2009-125062 filed in the Japanese Patent Office on May 25, 2009, the entire content of which is incorporated herein by reference.

BACKGROUND OF THE INVENTION

1. Field of the Invention

The present invention relates to an imaging apparatus and a shake correcting method, and more particularly, to an imaging apparatus and a shake correcting method that are capable of performing shake correction by effectively using an image sensing area of an imaging device.

2. Description of the Related Art

In related art, for imaging apparatuses using a silver halide camera or a solid-state imaging device, various shake correcting technologies have been proposed as a method for preventing deterioration of image performance or image displacement due to a shake generated when photographing in a handheld state.

According to such shake correcting technologies, the shake of the imaging apparatus is detected, for example, in accordance with a sensor signal transmitted from an angular velocity sensor, or the shake of the imaging apparatus is detected based on a motion of a subject image by using an image signal transmitted from an imaging device. In addition, an image signal in which the shake of the imaging apparatus is corrected is acquired by extracting an image of an extraction area moved in accordance with the result of shake detection by using an imaging device having an image sensing area larger than an extraction area representing an imaging range that may be needed and outputting the image (for example, see JP-A-7-177419).

SUMMARY OF THE INVENTION

However, when the imaging device having the image sensing area (effective pixel area) larger than the extraction area is used, as shown in FIG. 13A, a redundant area can be arranged in the vertical direction or the horizontal direction with respect to the extraction area. In addition, a redundant area can be acquired not only by using the imaging device having the image sensing area larger than the extraction area but also by reducing the extraction area in which pixel signals are read. For example, as shown in FIG. 13B, by reducing the extraction area, a redundant area can be arranged in the vertical direction or the horizontal direction. As described above, when the redundant area is arranged in the vertical direction or the horizontal direction, in order to correct the shake of rotation of an optical axis that is represented in FIG. 13C, the redundant area may need to be increased.

Here, in a case where the redundant area is arranged by configuring the image sensing area of the imaging device to be larger than the extraction area, the redundant area is used only for a case where the shake is corrected. Accordingly, when the redundant area is increased, an area used for generating an image in which the shake is corrected is decreased, and thereby the imaging device is not used effectively. In addition, in a case where the redundant area is arranged by reducing the extraction area, a redundant area larger than that for the shake correction in the vertical direction or the horizontal direction may be needed for the shake correction of rotation of the optical axis, and accordingly the extraction area is decreased. Therefore, when the image of the extraction area is enlarged to the size of a display image, the image deteriorates in the image quality and the like.

Thus, it is desirable to provide an imaging apparatus and a shake correcting method capable of performing shake correction by effectively using an image sensing area of an imaging device.

According to an embodiment of the present invention, there is provided an imaging apparatus including: an imaging unit that generates an image signal of a picked up image by performing photoelectric conversion for an optical image formed by an imaging optical system; a shake detecting unit that detects a shake; a correction amount setting unit that sets a shake correction amount used for correcting the shake based on the shake detected by the shake detecting unit; and a correction processing unit that performs correction of distortion aberration generated by the imaging optical system for the picked up image, movement of an extraction area for an image in which the distortion aberration is corrected in accordance with the shake correction amount, and extraction of an image of the extraction area.

According to this embodiment of the present invention, an image signal of a picked up image is generated by performing photoelectric conversion for an optical image formed by an imaging optical system. Then, by using a shake detecting sensor or detecting a motion vector by using a plurality of picked up images that are arranged in a time sequence, at least one of a shake in the direction of rotation about the optical axis of the imaging optical system and a shake of rotation about an axis perpendicular to the optical axis is detected, and a shake correction amount used for correcting the shake is set based on the detected shake. Then, for example, correction of the barrel distortion aberration generated by the imaging optical system is performed for the picked up image, and the extraction area for an image in which the barrel distortion aberration is corrected is moved in accordance with the shake correction amount. Accordingly, an image signal of the image in which the shake is corrected can be acquired by extracting the image of the extraction area. For example, an image signal of the image in which the distortion aberration is corrected is generated from the image signal of the picked up image by using distortion aberration correction data that is used for correcting the distortion aberration. In addition, the image signal of the extraction area that is moved in accordance with the shake correction amount is extracted from the image signal in which the distortion aberration is corrected. Alternatively, coordinate conversion is performed for the picked up image by using the distortion aberration correction data used for correcting the distortion aberration and the shake correction amount, and a predetermined coordinate range of the image after the coordinate conversion may be regarded as the extraction area after the movement.

According to another embodiment of the present invention, there is provided a shake correcting method including the steps of: detecting a shake by using a shake detecting unit; setting a shake correction amount used for correcting the shake based on the detected shake by using a correction amount setting unit; and correcting distortion aberration that is generated by the imaging optical system for a picked up image, moving an extraction area of an image in which the distortion aberration is corrected in accordance with the shake correction amount, and extracting an image of the extraction area by using a correction processing unit.

According to the embodiments of the present invention, an extraction area of the image in which the distortion aberration generated by the imaging optical system is corrected and in which the distortion aberration is corrected in accordance with the shake correction amount from the picked up image acquired by performing photoelectric conversion for the optical image formed by the imaging optical system is moved, and an image of the extraction area is extracted.

As described above, by extracting the image of the extraction area that is moved in accordance with the shake correction amount from the image in which the distortion aberration is corrected, an image signal of the image in which the shake is corrected can be acquired. In addition, by using the image in which the distortion aberration is corrected, the redundant area used for performing the shake correction can be increased. Accordingly, the shake can be corrected without arranging a redundant area in the imaging device or arranging a large area in the imaging device. Therefore, the shake can be corrected by effectively using the image sensing area of the imaging device.

BRIEF DESCRIPTION OF THE DRAWINGS

FIGS. 2A, 2B, and 2C are diagrams showing an example of a subject image and picked up images before and after correction of the distortion aberration.

FIG. 3 is a diagram illustrating a distortion aberration correcting operation.

FIG. 4 is a diagram illustrating the operation of an optical-axis rotation shake correcting section.

DESCRIPTION OF THE PREFERRED EMBODIMENTS

Hereinafter, embodiments of the present invention will be described. According to an embodiment of the present invention, an image signal of a picked up image is generated by an imaging unit by performing photoelectric conversion for an optical image that is formed by an imaging optical system. In addition, the shake is detected by a shake detection unit. Based on this detected shake, a shake correction amount for correcting the shake is set by a correction amount setting unit. A correction processing unit moves an extraction area so as to correct the shake by using a redundant area, which is generated by distortion aberration correction, by performing correction of the distortion aberration generated by the imaging optical system for the picked up image and performing movement of the extraction area and extraction of an image of the extraction area from the image in which the distortion aberration is corrected in accordance with the shake correction amount. In addition, by extracting the image of the extraction area, an image signal in which the shake is corrected is generated. The description will be made in the following order.

1. First Embodiment
2. Second Embodiment
3. Third Embodiment
4. Fourth Embodiment <1. First Embodiment>

[Configuration of Imaging Apparatus]

Figure 1:
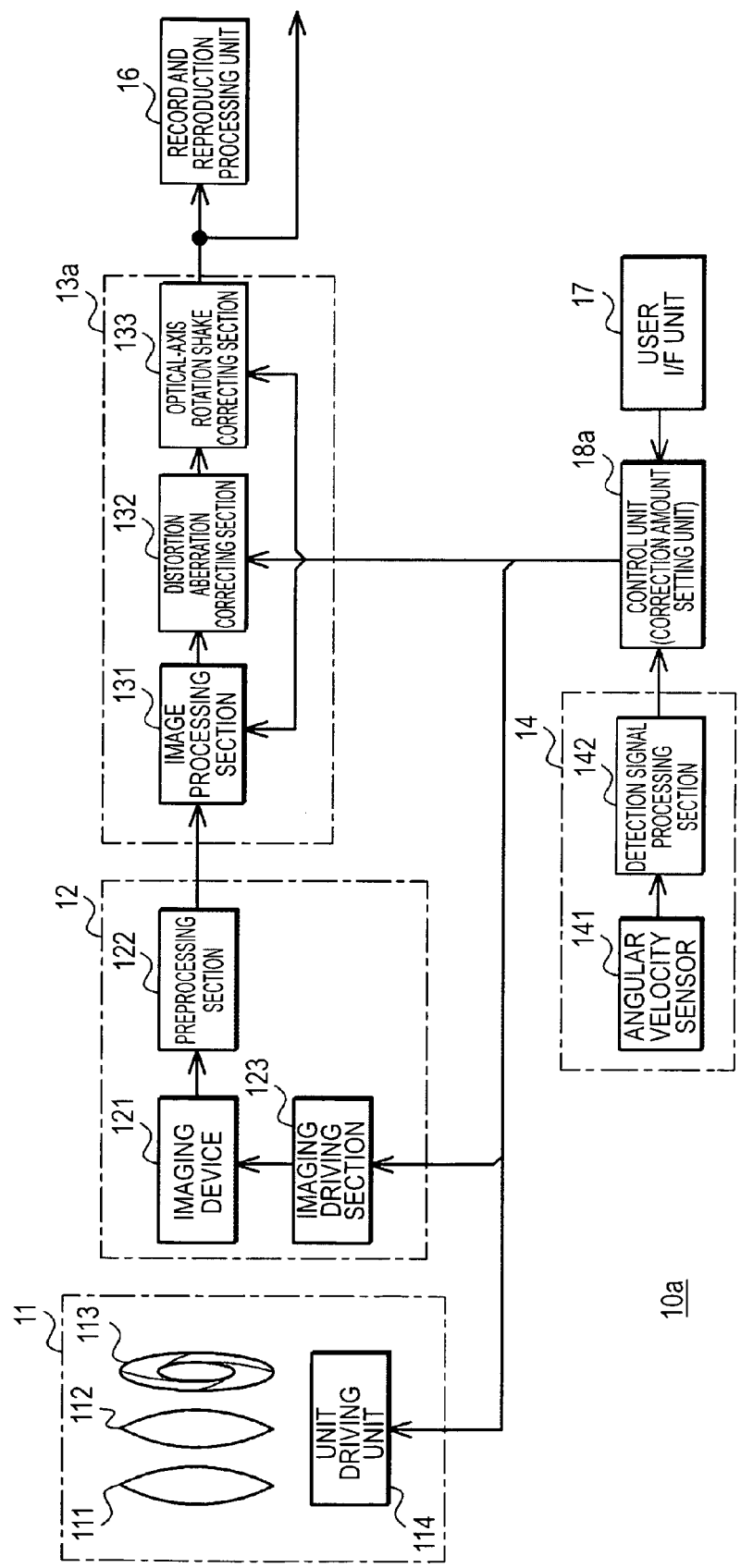
FIG. 1 is a functional block diagram showing the configuration of a first embodiment.

FIG. 1 is a functional block diagram showing the configuration of the first embodiment. An imaging apparatus 10a includes an imaging optical system 11, an imaging unit 12, a signal processing unit 13a, an optical-axis rotation shake detecting unit 14, a record and reproduction processing unit 16, a user interface (user I/F) unit 17, and a control unit 18a.

The imaging optical system 11 is configured by a zoom unit 111, a focus unit 112, a diaphragm unit 113, a unit driving unit 114, and the like. The zoom unit 111 is configured by using a zoom lens. The zoom unit 111 changes the focal distance by moving the zoom lens in the optical axis direction. In other words, the zoom unit 111 implements a zoom function. The focus unit 112 is configured by using a focus lens. The focus unit 112 adjusts the focus by moving the focus lens in the optical axis direction. The diaphragm 113 is configured by using an iris. The diaphragm unit 113 adjusts the amount of light by changing the aperture amount of the iris.

The imaging unit 12 is configured by an imaging device 121, a preprocessing section 122, a driving section 123, and the like. The imaging device 121 converts an optical image, which is imaged on an imaging surface by the imaging optical system 11, to the electrical signal by performing a photoelectric conversion process. As the imaging device 121, for example, a CCD (Charge Coupled Device) image sensor, a CMOS (Complementary Metal-Oxide Semiconductor) image sensor, or the like is used.

The preprocessing section 122 performs a noise elimination process such as a CDS (correlated double sampling) for an electrical signal that is generated by the imaging device 121. In addition, the preprocessing section 122 performs gain adjustment so as to adjust the signal level of the electrical signal to a desired signal level. In addition, the preprocessing section 122 converts an analog image signal that is an electrical signal for which the noise elimination process and the gain adjustment have been performed into a digital image signal by performing an A/D conversion process and outputs the digital image signal.

The driving section 123 generates an operation pulse and the like that may be needed for driving the imaging device 121. For example, the driving section 123 generates an electric-charge read-out pulse used for reading out electric charges, a transmission pulse used for performing transmission in the vertical direction or the horizontal direction, a shutter pulse used for performing an electronic shutter operation, and the like.

The signal processing unit 13a is configured by an image processing section 131, a distortion-aberration correcting section 132, an optical-axis rotation shake correcting section 133, and the like.

The image processing section 131 performs a camera processing process and the like for a digital image signal that is output from the imaging unit 12. The image processing section 131, for example, performs a non-linear process such as gamma correction or knee correction, a color correction process, a contour enhancement process, and the like for an image signal.

The distortion aberration correcting section 132 corrects the distortion aberration that is generated by the imaging optical system 11. The distortion aberration correcting section 132 generates an image signal of an image in which the distortion aberration is eliminated or reduced by converting coordinates of each pixel of the image signal including a distortion component into coordinates after correction by using distortion correction data according to the amount of distortion aberration. In addition, the distortion aberration correcting section 132 acquires positional information that represents the position of the zoom lens from the imaging optical system 11 when the amount of distortion aberration changes in accordance with the position of the zoom lens and changes the distortion correction data in accordance with the positional information. The distortion aberration correcting section 132 outputs the image signal of the image, in which the distortion aberration is eliminated or reduced, to the optical-axis rotation shake correcting section 133. Alternatively, the distortion correction data according to the position of the zoom lens may be configured to be supplied from the control unit 18a to be described later to the distortion aberration correction section 132.

The optical-axis rotation shake correcting section 133 extracts an image of the extraction area from the image in which the distortion aberration is corrected. In addition, the optical-axis rotation shake correcting section 133 moves (rotates) the extraction area in accordance with the shake correction amount (correction angle) notified from the control unit 18a to be described later. As described above, an image signal of the image in which the shake around the optical axis is corrected is generated by extracting an image from the image, in which the distortion aberration is corrected, such that a stopped subject is in a predetermined position on a screen even in a case where a shake of the rotation of the optical axis is generated by rotating the extraction area. The optical-axis rotation shake correcting section 133 outputs the image signal after the correction of rotation shake to the record and reproduction processing unit 16 or an external device.

The optical-axis rotation shake detecting unit 14 detects the shake of the rotation of the optical axis and outputs the detection result to the control unit 18a. The optical-axis rotation shake detecting unit 14, for example, includes an angular velocity sensor 141 and a detection signal processing section 142. The angular velocity sensor 141 generates a detection signal corresponding to the shake in the rotation direction about the optical axis and outputs the detection signal to the detection signal processing section 142. The detection signal processing section 142 performs a noise elimination process, a gain adjustment process, a DC component eliminating process, an A/D conversion process, and the like for the detection signal and outputs the detection signal after the process to the control unit 18a.

The record and reproduction processing unit 16 records the image signal that is output from the optical-axis rotation shake correcting section 133 on a recording medium. In addition, the record and reproduction processing unit 16 reads out the image signal recorded on the recording medium and outputs the image signal to an external device. The recording medium may be a removable type such as a memory card, an optical disc, or a magnetic tape or a fixed type such as an HDD or a semiconductor memory module. In addition, an encoded signal may be configured to be recorded on the recording medium by disposing an encoder or a decoder in the record and reproduction processing unit 16 and performing compression coding or expansion decoding of the image signal.

The user interface unit 17 is configured by operation switches, operation buttons, or the like. The user interface unit 17 generates an operation signal corresponding to a user's operation and outputs the operation signal to the control unit 18a.

The control unit 18a, for example, includes a CPU (Central Processing Unit), a ROM (Read Only Memory), and a RAM (Random Access Memory). The CPU reads out a control program that is stored in the ROM and executes the control program, as is necessary. In the ROM, as described above, programs executed by the CPU, data that may be needed for various processes, and the like are stored in advance. The RAM is a memory that is used as a so-called work area that temporarily stores intermediary results of processes or the like therein. In addition, the ROM and the RAM store information on various setting parameters, correction data, or the like therein.

The control unit 18a controls each unit in accordance with an operation signal transmitted from the user interface unit 17 or the like so as to allow the imaging apparatus 10a to perform an operation in accordance with a user's operation.

In addition, the control unit 18a operates as a correction amount setting unit when shake correction is performed. The control unit 18a sets the shake correction amount (correction angle) based on the detection signal that is output from the optical-axis rotation shake detecting unit and notifies the optical-axis rotation shake correcting section 133 of the shake correction amount. For example, in a case where the angular velocity sensor 141 is used in the optical-axis rotation shake detecting unit 14, the control unit 18a calculates the shake angle by integrating the detection signal transmitted from the optical-axis rotation shake detecting unit 14. In addition, the control unit 18a sets a correction angle used for correcting the shake angle and notifies the optical-axis rotation shake correcting section 133 of the set correction angle. In addition, for the rotation shake generated when photographing in a hand-held state, the frequency of the shake is not high. Accordingly, the control unit 18a performs a filtering process so as to pass only the frequency component of the hand shake for the detection signal. By performing such a filtering process, the control unit 18a can calculate the shake around the optical axis with high accuracy. In addition, the control unit 18a, as described above, may be configured to output the distortion correction data according to the position of the zoom lens to the distortion aberration correcting section 132.

[Operation of Imaging Apparatus]

When an image signal is supplied to the signal processing unit 13a from the imaging unit 12 by performing an imaging operation by using the imaging apparatus 10a, the image processing section 131 of the signal processing unit 13a performs camera process processing and the like for the image signal and outputs the image signal after the process to the distortion aberration correcting section 132. The distortion aberration correcting section 132 corrects the distortion aberration by using the image signal that is supplied from the image processing section 131.

In the peripheral edge portion of a lens, there is a phenomenon called distortion of an image under the influence of the optical aberration of the lens. This distortion aberration is determined depending on the lens of the imaging optical system 11, and accordingly, reduction of an image located in a position far away from the optical axis of the lens and the like occurs. In other words, distortion occurs in a concentric pattern having the optical axis of the lens as its center. FIGS. 2A, 2B, and 2C show an example of a subject image and picked up images before and after correction of the distortion aberration. For example, when a subject OB as shown in FIG.

2A is imaged, an image that is formed on an imaging surface of the imaging device 121, as shown in FIG. 2B, is an image in which barrel distortion aberration is generated due to the influence of the optical aberration of the imaging optical system 11.

The distortion aberration correcting section 132 generates an image signal of the image in which the distortion aberration is eliminated or reduced by converting the coordinates of each pixel of the image signal including the distortion component into coordinates after correction by using the distortion correction data corresponding to the amount of distortion aberration. FIG. 3 is a diagram illustrating a distortion aberration correcting operation. The distortion aberration correcting section 132 converts a pixel positioned at the coordinates (Xa, Yb) into a pixel positioned at the coordinates (Xc, Yd), for example, by multiplying the coordinates (Xa, Yb) of the image sensing area (effective pixel area) by the distortion correction data corresponding to the amount of distortion aberration. As the distortion aberration, distortion formed in a concentric pattern having the optical axis of the lens as its center is generated. Accordingly, the distortion correction data has a different value corresponding to a distance from the optical axis. In addition, when the distortion aberration changes in accordance with the position of the zoom lens, correction is performed by using the distortion correction data corresponding to the position of the zoom lens. As described above, by performing the correction of the barrel distortion aberration, the image sensing area, as shown in the correction diagram of FIG. 2C and FIG. 3, is an image area having a bobbin shape acquired by drawing out four corners of the image from the center of the image to the outer side.

Figure 5B:
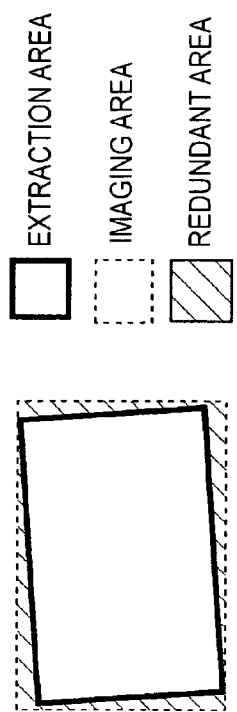
FIGS. 5A and 5B are diagrams illustrating the operation of an optical-axis rotation shake correcting section.
Figure 5A:
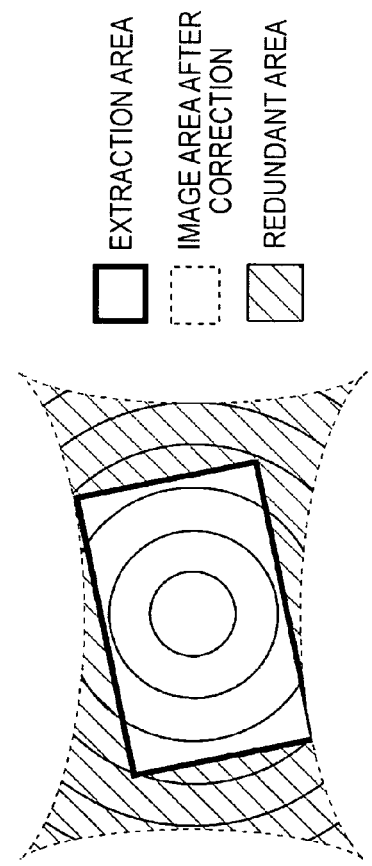

The optical-axis rotation shake correcting section 133 extracts an image of the extraction area from the image in which the distortion aberration is corrected. FIG. 4 and FIGS. 5A and 5B represent the operation of the optical-axis rotation shake correcting section 133. The optical-axis rotation shake correcting section 133 sets the extraction area from the image in which the distortion aberration is corrected such that the position of the optical axis is located at the center of the image, as shown in FIG. 4, at a time when the shake correction amount (correction angle) is not notified from the control unit 18a or when the correction angle is "0" and extracts an image of the extraction area. As described above, when the image in which the distortion aberration is corrected is used, the image in which the distortion aberration is corrected is an image having the size of the area greater than that before the correction of the distortion aberration, due to the correction of the distortion aberration. Accordingly, the image is in the state in which a redundant area is disposed on the outer side of the extraction area.

When the rotation shake is generated by the imaging apparatus 10a, the optical-axis rotation shake detecting unit 14 generates a detection signal corresponding to the shake of rotation of the optical axis and outputs the generated detection signal to the control unit 18a. The control unit 18a calculates a correction angle based on the detection signal transmitted from the optical-axis rotation shake detecting unit 14 and notifies the optical-axis rotation shake correcting section 133 of the correction angle.

When the correction angle of the shake correction amount (correction angle) notified from the control unit 18a is not "0", the optical-axis rotation shake correcting section 133 rotates the extraction area, which is set such that the position of the optical axis is located at the center of the image, by the correction angle about the position of the optical axis, as shown in FIG. 5A. Then, the optical-axis rotation shake correcting section 133 extracts an image from the extraction area after being rotated further. Here, the image after the correction of the distortion aberration has a bobbin shape whose four corners are drawn out from the center of the image to the outer side. Accordingly, the redundant area in the four corners is broadened. Thus, when extracting an image of the extraction area from the image after the correction of the distortion aberration, the optical-axis rotation shake correcting section 133 can respond to a greater correction angle. In addition, FIG. 5B shows a general case where a redundant area is acquired by using an imaging device that has an image sensing area larger than the extraction area as a reference. In such a case, for example, on the upper side of the extraction area, the width of the redundant area is the same in any position. Similarly, on the lower side of the extraction area or the left or right side of the extraction area, the width of the redundant area is the same in any position. Accordingly, when the shake is corrected by moving the extraction area in the vertical direction or the horizontal direction, the redundant area can be effectively utilized. However, when the extraction area is rotated, the movement amount of the four corners of the extraction area in the vertical direction or the horizontal direction is regulated by the width of the redundant area. Accordingly, unlike the case where the image after the correction of the distortion aberration is used, it is difficult to correct the rotation shake by effectively utilizing the redundant area.

As described above, by performing the correction of the rotation shake by using the image in which the distortion aberration has been corrected, the shake generated in the rotation direction can be corrected without reducing the extraction area or using an imaging device having the image sensing area larger than the extraction area. Accordingly, the shake can be corrected by effectively utilizing the image sensing area of the imaging device. In addition, in a case where an imaging device having the image sensing area larger than the extraction area is used, the shake in the rotation direction, which is greater than that in the general case, can be corrected.

<2. Second Embodiment>

In the first embodiment, the operation of correcting the shake of rotation of the optical axis has been described. However, the correction of the shake performed by using the image after the correction of the distortion aberration is not limited to the shake of rotation of the optical axis, and accordingly the shake generated in the horizontal direction or the vertical direction can be corrected. Next, the correction of the shake generated in the horizontal direction or the vertical direction that is performed by using the image after the correction of distortion aberration will be described as a second embodiment of the present invention.

[Configuration of Imaging Apparatus]

Figure 6:
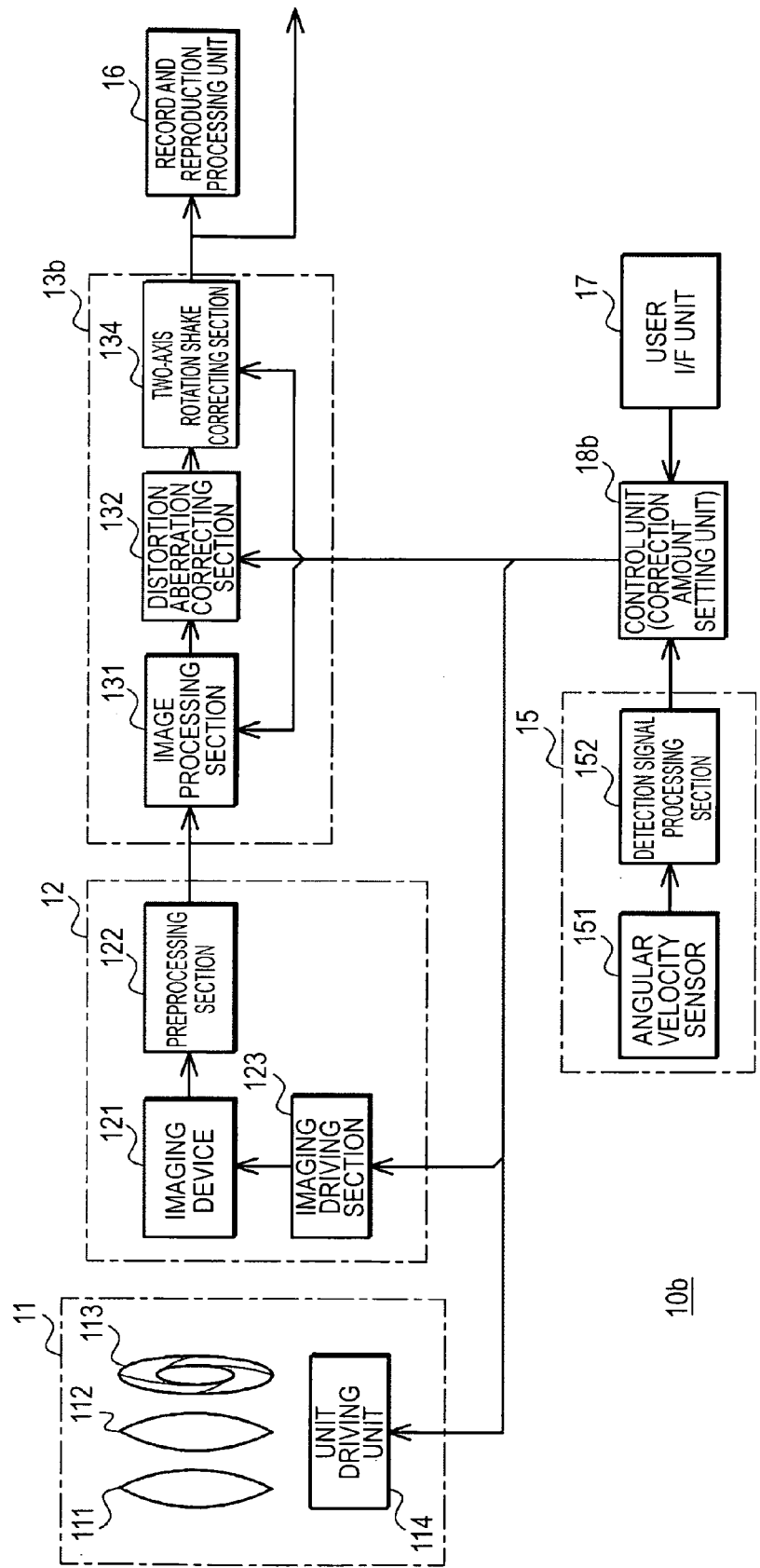
FIG. 6 is a functional block diagram showing the configuration of a second embodiment.

FIG. 6 is a functional block diagram showing the configuration of the second embodiment. An imaging apparatus 10b includes an imaging optical system 11, an imaging unit 12, a signal processing unit 13b, a two-axis rotation shake detecting unit 15, a record and reproduction processing unit 16, a user interface unit 17, and a control unit 18b.

The imaging optical system 11 is configured by a zoom unit 111, a focus unit 112, a diaphragm unit 113, a unit driving unit 114, and the like. The zoom unit 111 is configured by using a zoom lens. The zoom unit 111 changes the focal distance by moving the zoom lens in the optical axis direction. The focus unit 112 is configured by using a focus lens. The focus unit 112 adjusts the focus by moving the focus lens in the optical axis direction. The diaphragm 113 is configured by using an iris. The diaphragm unit 113 adjusts the amount of light by changing the aperture amount of the iris.

The imaging unit 12 is configured by an imaging device 121, a preprocessing section 122, a driving section 123, and the like. The imaging device 121 converts an optical image, which is imaged on an imaging surface by the imaging optical system 11, to the electrical signal by performing a photoelectric conversion process. As the imaging device 121, for example, a CCD image sensor, a CMOS (Complementary Metal-Oxide Semiconductor) image sensor, or the like is used.

The preprocessing section 122 performs a noise elimination process such as a CDS for an electrical signal that is generated by the imaging device 121. In addition, the preprocessing section 122 performs gain adjustment so as to adjust the signal level of the electrical signal to a desired signal level. In addition, the preprocessing section 122 converts an analog image signal that is an electrical signal for which the noise elimination process and the gain adjustment have been performed into a digital image signal by performing an A/D conversion process and outputs the digital image signal.

The driving section 123 generates an operation pulse and the like that may be needed for driving the imaging device 121. For example, the driving section 123 generates an electric-charge read-out pulse used for reading out electric charges, a transmission pulse used for performing transmission in the vertical direction or the horizontal direction, a shutter pulse used for performing an electronic shutter operation, and the like.

The signal processing unit 13b is configured by an image processing section 131, a distortion-aberration correcting section 132, a two-axis rotation shake correcting section 134, and the like.

The image processing section 131 performs a camera processing process and the like for a digital image signal that is output from the imaging unit 12. The image processing section 131, for example, performs a non-linear process such as gamma correction or knee correction, a color correction process, a contour enhancement process, and the like for an image signal.

The distortion aberration correcting section 132 corrects the distortion aberration that is generated by the imaging optical system 11. The distortion aberration correcting section 132 generates an image signal of an image in which the distortion aberration is eliminated or reduced by converting coordinates of each pixel of the image signal including a distortion component into coordinates after correction by using distortion correction data according to the amount of distortion aberration. In addition, the distortion aberration correcting section 132 acquires positional information that represents the position of the zoom lens from the imaging optical system 11 when the amount of distortion aberration changes in accordance with the position of the zoom lens and changes the distortion correction data in accordance with the positional information. The distortion aberration correcting section 132 outputs the image signal of the image, in which the distortion aberration is eliminated or reduced, to the two-axis rotation shake correcting section 134. Alternatively, the distortion correction data according to the position of the zoom lens may be configured to be supplied from the control unit 18b to be described later to the distortion aberration correction section 132.

The two-axis rotation shake correcting section 134 extracts an image of the extraction area from the image in which the distortion aberration is corrected. In addition, the two-axis rotation shake correcting section 134 moves (rotates) the extraction area in accordance with the shake correction amount (correction movement amount) notified from the control unit 18b to be described later. As described above, an image signal of the image in which the shake around the optical axis is corrected is generated by extracting an image from the image, in which the distortion aberration is corrected, such that a stopped subject is in a predetermined position on a screen even in a case where a shake of the rotation of the two axes is generated by moving the extraction area. The two-axis rotation shake correcting section 134 outputs the image signal after the correction of the shake to the record and reproduction processing unit 16 or an external device.

The two-axis rotation shake detecting unit 15 detects the shake of the rotation of two axes perpendicular to the optical axis and outputs the detection result to the control unit 18b. The two-axis rotation shake detecting unit 15, for example, includes an angular velocity sensor 151 and a detection signal processing section 152. The angular velocity sensor 151 generates detection signals corresponding to the shake of rotation of the two axes perpendicular to the optical axis. For example, the angular velocity sensor 151 generates detection signals corresponding to the shake of rotation about the two axes including a vertical axis and a horizontal axis that are perpendicular to the optical axis. In other words, the shake of rotation about the vertical axis corresponds to the shake generated in the pan direction. On the other hand, the shake of rotation about the horizontal axis corresponding to the shake generated in the tilt direction. Accordingly, in a case where detection signals are generated in accordance with the shake of rotation about the vertical axis and the horizontal axis, the detection signals represent the shakes generated in the pan and tilt directions. The angular velocity sensor 151 outputs the generated detection signals to the detection signal processing section 152.

The detection signal processing section 152 performs a noise elimination process, a gain adjustment process, a DC component eliminating process, an A/D conversion process, and the like for the detection signals and outputs the detection signals after the process to the control unit 18b.

The record and reproduction processing unit 16 records the image signal that is output from the two-axis rotation shake correcting section 134 on a recording medium. In addition, the record and reproduction processing unit 16 reads out the image signal recorded on the recording medium and outputs the image signal to an external device. The recording medium may be a removable type such as a memory card, an optical disc, or a magnetic tape or a fixed type such as an HDD or a semiconductor memory module. In addition, an encoded signal may be configured to be recorded on the recording medium by disposing an encoder or a decoder in the record and reproduction processing unit 16 and performing compression coding or expansion decoding of the image signal.

The user interface unit 17 is configured by operation switches, operation buttons, or the like. The user interface unit 17 generates an operation signal corresponding to a user's operation and outputs the operation signal to the control unit 18b.

The control unit 18b controls each unit in accordance with an operation signal transmitted from the user interface unit 17 or the like so as to allow the imaging apparatus 10b to perform an operation in accordance with a user's operation.

In addition, the control unit 18b operates as a correction amount setting unit when shake correction is performed. The control unit 18b sets the shake correction amount (correction movement amount) based on the detection signal that is output from the two-axis rotation shake detecting unit 15 and notifies the two-axis rotation shake correcting section 134 of the set shake correction amount. For example, in a case where the angular velocity sensor 151 is used in the two-axis rotation shake detecting unit 15, the control unit 18b calculates the shake angle generated in the pan direction or the tilt direction by integrating the detection signal. Accordingly, the control unit 18b sets a shake correction amount (correction movement amount) so as to correct the shake angle and notifies the two-axis rotation shake correcting section 134 of the shake correction amount. In addition, for the rotation shake generated when photographing in a hand-held state, the frequency of the shake is not high. Accordingly, the control unit 18b performs a filtering process so as to pass only the frequency component of the hand shake for the detection signal. By performing such a filtering process, the control unit 18b can calculate the shakes in the pan direction and the tilt direction with high accuracy. In addition, the control unit 18b, as described above, may be configured to output the distortion correction data according to the position of the zoom lens to the distortion aberration correcting section 132.

[Operation of Imaging Apparatus]

When an image signal is supplied to the signal processing unit 13b from the imaging unit 12 by performing an imaging operation by using the imaging apparatus 10b, the image processing section 131 of the signal processing unit 13b performs camera process processing and the like for the image signal and outputs the image signal after the process to the distortion aberration correcting section 132. The distortion aberration correcting section 132 corrects the distortion aberration by using the image signal that is supplied from the image processing section 131.

The distortion aberration is determined depending on the lens of the imaging optical system 11, and accordingly, distortion such as reduction of an image located in a position far away from the optical axis of the lens and the like occurs. In other words, as described in the first embodiment, distortion occurs in a concentric pattern having the optical axis of the lens as its center.

The distortion aberration correcting section 132 generates an image signal of the image in which the distortion aberration is eliminated or reduced by converting the coordinates of each pixel of the image signal including the distortion component into coordinates after correction by using the distortion correction data corresponding to the amount of distortion aberration.

The two-axis rotation shake correcting section 134 extracts an image of the extraction area from the image in which the distortion aberration is corrected. The two-axis rotation shake correcting section 134 sets the extraction area from the image in which the distortion aberration is corrected such that the position of the optical axis is located at the center of the image, as shown in FIG. 4, at a time when the shake correction amount (correction movement amount) is not notified from the control unit 18b or when the shake correction amount is "0" and extracts an image of the extraction area. As described above, when the image in which the distortion aberration is corrected is used, the image in which the distortion aberration is corrected is an image having the size of the area greater than that the size of the area of the extraction area, due to the correction of the distortion aberration. Accordingly, the image is in the state in which a redundant area is disposed on the outer side of the extraction area.

When the shake is generated in the pan direction or the tilt direction by the imaging apparatus 10b, the two-axis rotation shake detecting unit 15 generates a detection signal corresponding to the shake generated in the pan direction or the tilt direction and outputs the generated detection signal to the control unit 18b. The control unit 18b calculates a shake correction amount (correction movement amount) based on the detection signal transmitted from the two-axis rotation shake detecting unit 15 and notifies the two-axis rotation shake correcting section 134 of the shake correction amount.

Figure 7:
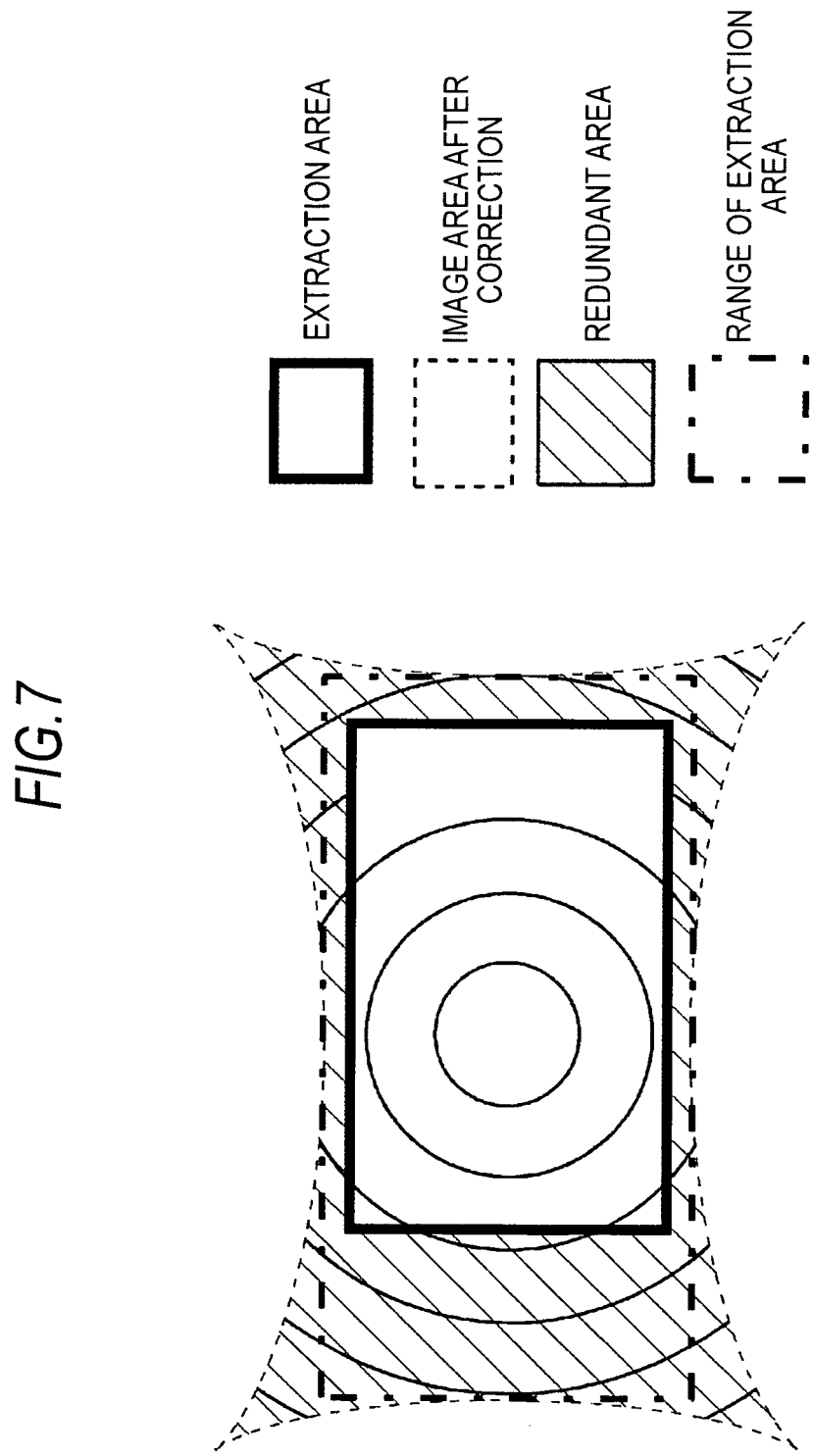
FIG. 7 is a diagram illustrating the operation of a two-axis rotation shake correcting section.

When the shake correction amount (correction movement amount) notified from the control unit 18b is not "0", the two-axis rotation shake correcting section 134 moves the extraction area by the shake correction amount, as shown in FIG. 7, from the image in which the distortion aberration is corrected. Then, the two-axis rotation shake correcting section 134 extracts an image from the extraction area after being moved further. Here, the image after the correction of the distortion aberration has a bobbin shape whose four corners are drawn out from the center of the image to the outer side. Accordingly, the redundant area in the four corners is broadened. Thus, the two-axis rotation shake correcting section 134 extracts an image of the extraction area moved by the shake correction amount from the image after the correction of the distortion aberration.

As described above, by performing the correction of the two-axis rotation shake by using the image in which the distortion aberration has been corrected, the shake generated in the pan direction or the tilt direction can be corrected without reducing the extraction area or using an imaging device having the image sensing area larger than the extraction area. Accordingly, the shake can be corrected by effectively utilizing the image sensing area of the imaging device. In addition, in a case where an imaging device having the image sensing area larger than the extraction area is used, the shake in the pan direction or the tilt direction, which is greater than that of a general case, can be corrected. In FIG. 7, an area denoted by a dashed dotted line represents the movement range of the extraction area that is moved in accordance with the shake of two-axis rotation.

Thus, the shake of two-axis rotation is corrected by moving the extraction area within the area denoted by the dashed dotted line.

<3. Third Embodiment>

In the first and second embodiments, a case where the shake of rotation of the optical axis or the two-axis rotation is detected by using the angular velocity sensor has been described. However, the shake of the rotation of the optical axis or the two-axis rotation may be detected from a picked up image. Next, as a third embodiment of the present invention, a case where a shake is detected from a picked up image, and the detected shake is corrected by using an image after the correction of the distortion aberration will be described.

[Configuration of Imaging Apparatus]

Figure 8:
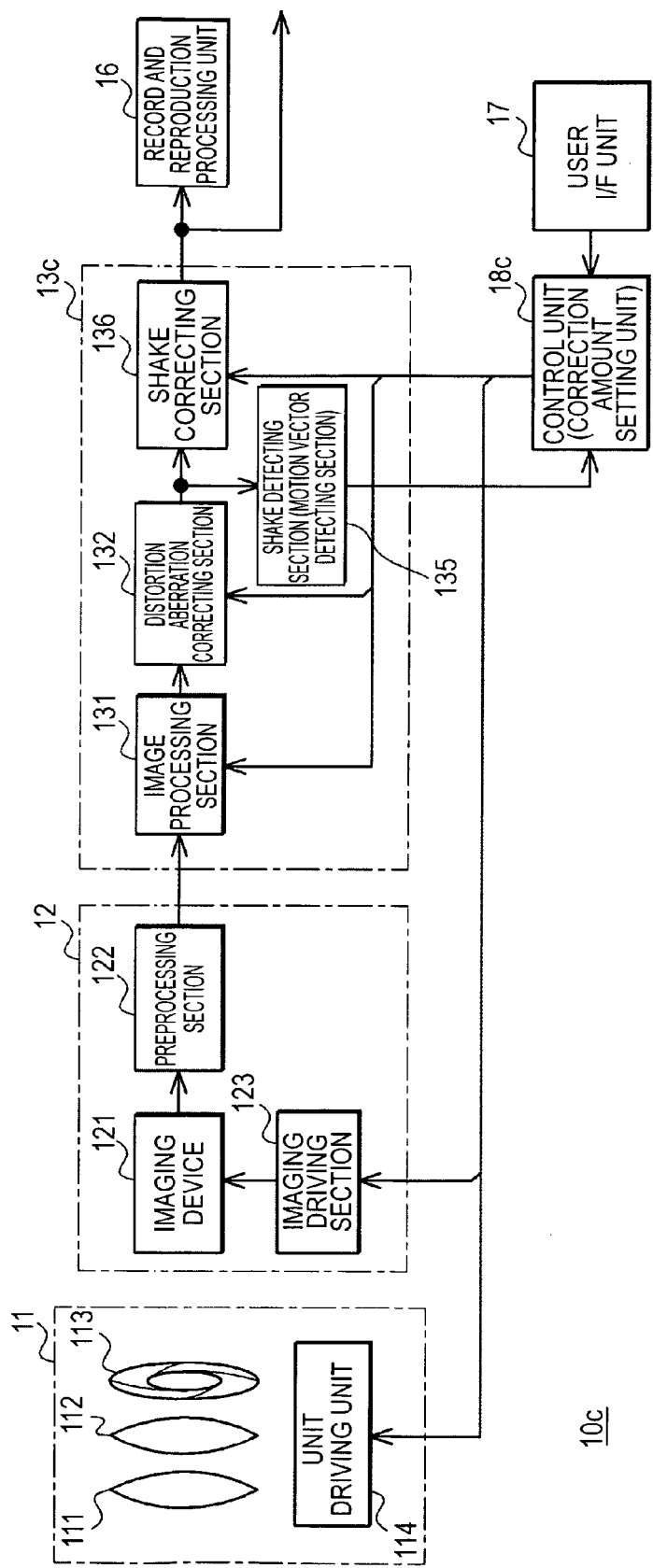
FIG. 8 is a functional block diagram showing the configuration of a third embodiment.

FIG. 8 is a functional block diagram showing the configuration of the third embodiment. An imaging apparatus 10c includes an imaging optical system 11, an imaging unit 12, a signal processing unit 13c, a record and reproduction processing unit 16, a user interface unit 17, and a control unit 18c.

The imaging optical system 11 is configured by a zoom unit 111, a focus unit 112, a diaphragm unit 113, a unit driving unit 114, and the like. The zoom unit 111 is configured by using a zoom lens. The zoom unit 111 changes the focal distance by moving the zoom lens in the optical axis direction. The focus unit 112 is configured by using a focus lens. The focus unit 112 adjusts the focus by moving the focus lens in the optical axis direction. The diaphragm 113 is configured by using an iris. The diaphragm unit 113 adjusts the amount of light by changing the aperture amount of the iris.

The imaging unit 12 is configured by an imaging device 121, a preprocessing section 122, a driving section 123, and the like. The imaging device 121 converts an optical image, which is imaged on an imaging surface by the imaging optical system 11, to the electrical signal by performing a photoelectric conversion process. As the imaging device 121, for example, a CCD (Charge Coupled Device) image sensor, a CMOS image sensor, or the like is used.

The preprocessing section 122 performs a noise elimination process such as a CDS for an electrical signal that is generated by the imaging device 121. In addition, the preprocessing section 122 performs gain adjustment so as to adjust the signal level of the electrical signal to a desired signal level. In addition, the preprocessing section 122 converts an analog image signal that is an electrical signal for which the noise elimination process and the gain adjustment have been performed into a digital image signal by performing an A/D conversion process and outputs the digital image signal.

The driving section 123 generates an operation pulse and the like that may be needed for driving the imaging device 121. For example, the driving section 123 generates an electric-charge read-out pulse used for reading out electric charges, a transmission pulse used for performing transmission in the vertical direction or the horizontal direction, a shutter pulse used for performing an electronic shutter operation, and the like.

The signal processing unit 13c is configured by an image processing section 131, a distortion-aberration correcting section 132, a shake detecting section 135, a shake correcting section 136, and the like.

The image processing section 131 performs a camera processing process and the like for a digital image signal that is output from the imaging unit 12. The image processing section 131, for example, performs a non-linear process such as gamma correction or knee correction, a color correction process, a contour enhancement process, and the like for an image signal.

The distortion aberration correcting section 132 corrects the distortion aberration that is generated by the imaging optical system 11. The distortion aberration correcting section 132 generates an image signal of an image in which the distortion aberration is eliminated or reduced by converting coordinates of each pixel of the image signal including a distortion component into coordinates after correction by using distortion correction data according to the amount of distortion aberration. In addition, the distortion aberration correcting section 132 acquires positional information that represents the position of the zoom lens from the imaging optical system 11 when the amount of distortion aberration changes in accordance with the position of the zoom lens and changes the distortion correction data in accordance with the positional information. The distortion aberration correcting section 132 outputs the image signal of the image, in which the distortion aberration is eliminated or reduced, to the shake detecting section 135 and the shake correcting section 136. Alternatively, the distortion correction data according to the position of the zoom lens may be configured to be supplied from the control unit 18c to be described later to the distortion aberration correction section 132.

The shake detecting section 135 includes a motion vector detecting portion that detects a motion vector of the image that is generated by the shake from a plurality of images arranged in a time sequence based on the image signal transmitted from the distortion aberration correcting section 132. The motion vector detecting portion calculates the motion vector of the image, for example, by using a representative point matching method. The representative point matching method is a method in which, for image signals of images picked up at different times, a motion vector is detected by detecting pixels of luminance levels, which are closest to the luminance levels of representative points of an image signal at a first time, among the image signals at a second time. In addition, for the calculation of the motion vector, a method other than the representative point matching method may be used.

The shake correcting section 136 extracts an image of the extraction area from the image in which the distortion aberration is corrected. In addition, the shake correcting section 136 moves and/or rotates the extraction area in accordance with the shake correction amount (the correction movement amount and/or the correction angle) notified from the control unit 18c to be described later. As described above, by moving and/or rotating the extraction area, an image is extracted from the image in which the distortion aberration is corrected such that a stopped subject is located in a predetermined position on the screen even in a case where a hand shake is generated. Then, the shake correcting section 136 outputs an image signal after the shake correction to the record and reproduction processing unit 16 or an external device.

The user interface unit 17 is configured by operation switches, operation buttons, or the like. The user interface unit 17 generates an operation signal corresponding to a user's operation and outputs the operation signal to the control unit 18c.

The control unit 18c controls each unit in accordance with an operation signal transmitted from the user interface unit 17 or the like so as to allow the imaging apparatus 10c to perform an operation in accordance with a user's operation. In addition, the control unit 18c operates as a correction amount setting unit when shake correction is performed. The control unit 18c sets the shake correction amount based on the motion vector detected by the shake detecting section 135 and notifies the shake correcting section 136 of the set shake correction amount. In addition, the control unit 18c, as described above, may be configured to output the distortion correction data according to the position of the zoom lens to the distortion aberration correcting section 132.

[Operation of Imaging Apparatus]

When an image signal is supplied to the signal processing unit 13c from the imaging unit 12 by performing an imaging operation by using the imaging apparatus 10c, the image processing section 131 of the signal processing unit 13c performs camera process processing and the like for the image signal and outputs the image signal after the process to the distortion aberration correcting section 132. The distortion aberration correcting section 132 corrects the distortion aberration by using the image signal that is supplied from the image processing section 131.

The distortion aberration is determined depending on the lens of the imaging optical system 11, and accordingly, distortion such as reduction of an image located in a position far away from the optical axis of the lens and the like occurs. In other words, as described in the first embodiment, distortion occurs in a concentric pattern having the optical axis of the lens as its center.

The distortion aberration correcting section 132 generates an image signal of the image in which the distortion aberration is eliminated or reduced by converting the coordinates of each pixel of the image signal including the distortion component into coordinates after correction by using the distortion correction data corresponding to the amount of distortion aberration.

The shake detecting section 135 detects a motion vector of an image based on the image signal transmitted from the distortion aberration correcting section 132 and outputs to the control unit 18c. The control unit 18c determines the shake amount by integrating the motion vector, calculates the shake correction amount used for correcting the determined shake, and outputs the shake correction amount to the shake correcting section 136.

The shake correcting section 136 extracts an image of the extraction area from the image in which the distortion aberration is corrected. The shake correcting section 136 sets the extraction area from the image in which the distortion aberration is corrected such that the position of the optical axis is located at the center of the image, as shown in FIG. 4, at a time when the shake correction amount is not notified from the control unit 18c or when the shake correction amount is "0" and extracts an image of the extraction area. As described above, when the image in which the distortion aberration is corrected is used, the image in which the distortion aberration is corrected is an image having the size of the area greater than the size of the area of the extraction area, due to the correction of the distortion aberration. Accordingly, the image is in the state in which a redundant area is disposed on the outer side of the extraction area.

When the shake is generated in the pan direction, the tilt direction, or the direction of rotation about the optical axis by the imaging apparatus 10c, the shake detecting section 135 generates a motion vector that represents the shake generated in the pan direction, the tilt direction, or the direction of rotation about the optical axis and outputs the motion vector to the control unit 18c. The control unit 18c sets the shake correction amount based on the motion vector output from the shake detecting section 135 and notifies the shake detecting section 136 of the set shake correction amount.

When the shake correction amount notified from the control unit 18c is not "0", the shake correcting section 136 moves the extraction area by the shake correction amount, as shown in FIG. 7, from the image in which the distortion aberration is corrected. Then, the shake correcting section 136 extracts an image from the extraction area after being moved further. Here, the image after the correction of the distortion aberration has a bobbin shape whose four corners are drawn out from the center of the image to the outer side. Accordingly, the redundant area in the four corners is broadened. Thus, the shake correcting section 136 extracts an image of the extraction area moved by the shake correction amount from the image after the correction of the distortion aberration.

As described above, by correcting the shake by using the image in which the distortion aberration has been corrected, the shake can be corrected by effectively utilizing the imaging device.

As described above, by performing the correction of the rotation shake by using the image in which the distortion aberration has been corrected, the shake can be corrected without reducing the extraction area or using an imaging device having the image sensing area larger than the extraction area. Accordingly, the shake can be corrected by utilizing the image sensing area of the imaging device effectively. In addition, in a case where an imaging device having the image sensing area larger than the extraction area is used, the shake that is greater than that in the general case can be corrected.

<4. Fourth Embodiment>

In the above-described first to third embodiments, a case where an image signal in which the distortion aberration is corrected by the distortion aberration correcting section 132 is generated, and an image signal of an image in which the shake is corrected is extracted from the image signal in which the distortion aberration is corrected has been described. Here, when the correction of the distortion aberration and the shake correction are simultaneously performed, an image signal in which the distortion aberration is corrected and the shake is corrected can be generated from the image signal of a picked up image without generating an image signal in which the distortion aberration is corrected. Next, as a fourth embodiment of the present invention, a case where the correction of the distortion aberration and the shake correction are simultaneously performed will be described.

[Configuration of Imaging Apparatus]

Figure 9:
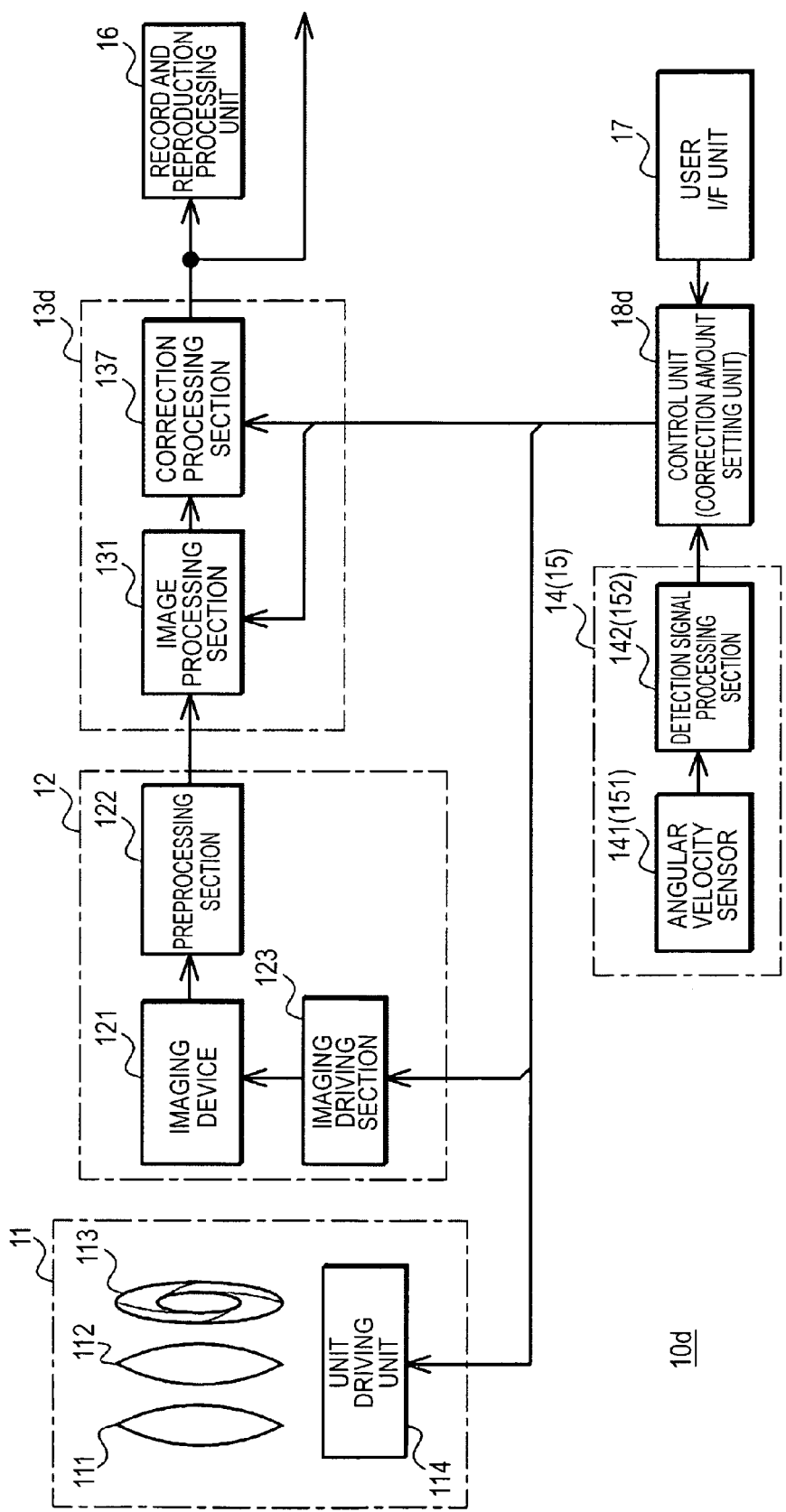
FIG. 9 is a functional block diagram showing the configuration of a fourth embodiment.

FIG. 9 is a functional block diagram showing the configuration of the fourth embodiment. An imaging apparatus 10d includes an imaging optical system 11, an imaging unit 12, a signal processing unit 13d, a record and reproduction processing unit 16, a user interface unit 17, and a control unit 18a (18c). In addition, in order to detect a shake, the imaging apparatus 10d includes an optical-axis rotation shake detecting unit 14 and/or a two-axis rotation shake detecting unit 15.

The imaging optical system 11 is configured by a zoom unit 111, a focus unit 112, a diaphragm unit 113, a unit driving unit 114, and the like. The zoom unit 111 is configured by using a zoom lens. The zoom unit 111 changes the focal distance by moving the zoom lens in the optical axis direction. The focus unit 112 is configured by using a focus lens. The focus unit 112 adjusts the focus by moving the focus lens in the optical axis direction. The diaphragm 113 is configured by using an iris. The diaphragm unit 113 adjusts the amount of light by changing the aperture amount of the iris.

The imaging unit 12 is configured by an imaging device 121, a preprocessing section 122, a driving section 123, and the like. The imaging device 121 converts an optical image, which is imaged on an imaging surface by the imaging optical system 11, to the electrical signal by performing a photoelectric conversion process. As the imaging device 121, for example, a CCD image sensor, a CMOS image sensor, or the like is used.

The preprocessing section 122 performs a noise elimination process such as a CDS for an electrical signal that is generated by the imaging device 121. In addition, the preprocessing section 122 performs gain adjustment so as to adjust the signal level of the electrical signal to a desired signal level. In addition, the preprocessing section 122 converts an analog image signal that is an electrical signal for which the noise elimination process and the gain adjustment have been performed into a digital image signal by performing an A/D conversion process and outputs the digital image signal.

The driving section 123 generates an operation pulse and the like that may be needed for driving the imaging device 121. For example, the driving section 123 generates an electric-charge read-out pulse used for reading out electric charges, a transmission pulse used for performing transmission in the vertical direction or the horizontal direction, a shutter pulse used for performing an electronic shutter operation, and the like.

The signal processing unit 13d is configured by an image processing section 131 and a correction processing section 137.

The image processing section 131 performs a camera processing process and the like for a digital image signal that is output from the imaging unit 12. The image processing section 131, for example, performs a non-linear process such as gamma correction or knee correction, a color correction process, a contour enhancement process, and the like for an image signal.

The correction processing section 137 performs coordinate conversion for a picked up image by using distortion aberration correction data used for correcting the distortion aberration generated by the imaging optical system and a shake correction amount notified from the control unit 18d to be described later. In addition, the correction processing section 137 uses the area of the picked up image before conversion of the coordinates as an extraction area, and an image signal in which the distortion aberration and the shake are corrected is generated by extracting an image from the extraction area. In addition, the correction procession section 137 outputs the image signal in which the shake is corrected to the record and reproduction processing unit 16 or an external device.

The optical-axis rotation shake detecting unit 14 and/or the two-axis rotation shake detecting unit 15 detect the rotation shake and output a detection signal representing the detection result to the control unit 18d.

The record and reproduction processing unit 16 records the image signal that is output from the two-axis rotation shake correcting section 134 on a recording medium. In addition, the record and reproduction processing unit 16 reads out the image signal recorded on the recording medium and outputs the image signal to an external device. The recording medium may be a removable type such as a memory card, an optical disc, or a magnetic tape or a fixed type such as a HDD or a semiconductor memory module. In addition, an encoded signal may be configured to be recorded on the recording medium by disposing an encoder or a decoder in the record and reproduction processing unit 16 and performing compression coding or expansion decoding of the image signal.

The user interface unit 17 is configured by operation switches, operation buttons, or the like. The user interface unit 17 generates an operation signal corresponding to a user's operation and outputs the operation signal to the control unit 18d.

The control unit 18d controls each unit in accordance with an operation signal transmitted from the user interface unit 17 or the like so as to allow the imaging apparatus 10d to perform an operation in accordance with a user's operation. In addition, the control unit 18d operates as a correction amount setting unit when shake correction is performed. The control unit 18d sets the shake correction amount based on the detection signal that is supplied from the optical-axis rotation shake detecting unit 14 and/or the two-axis rotation shake detecting unit 15 and notifies the correction processing section 137 of the set shake correction amount.

[Operation of Imaging Apparatus]

When an image signal is supplied to the signal processing unit 13d from the imaging unit 12 by performing an imaging operation by using the imaging apparatus 10d, the image processing section 131 of the signal processing unit 13d performs camera process processing and the like for the image signal and outputs the image signal after the process to the correction processing section 137.

Figure 10:
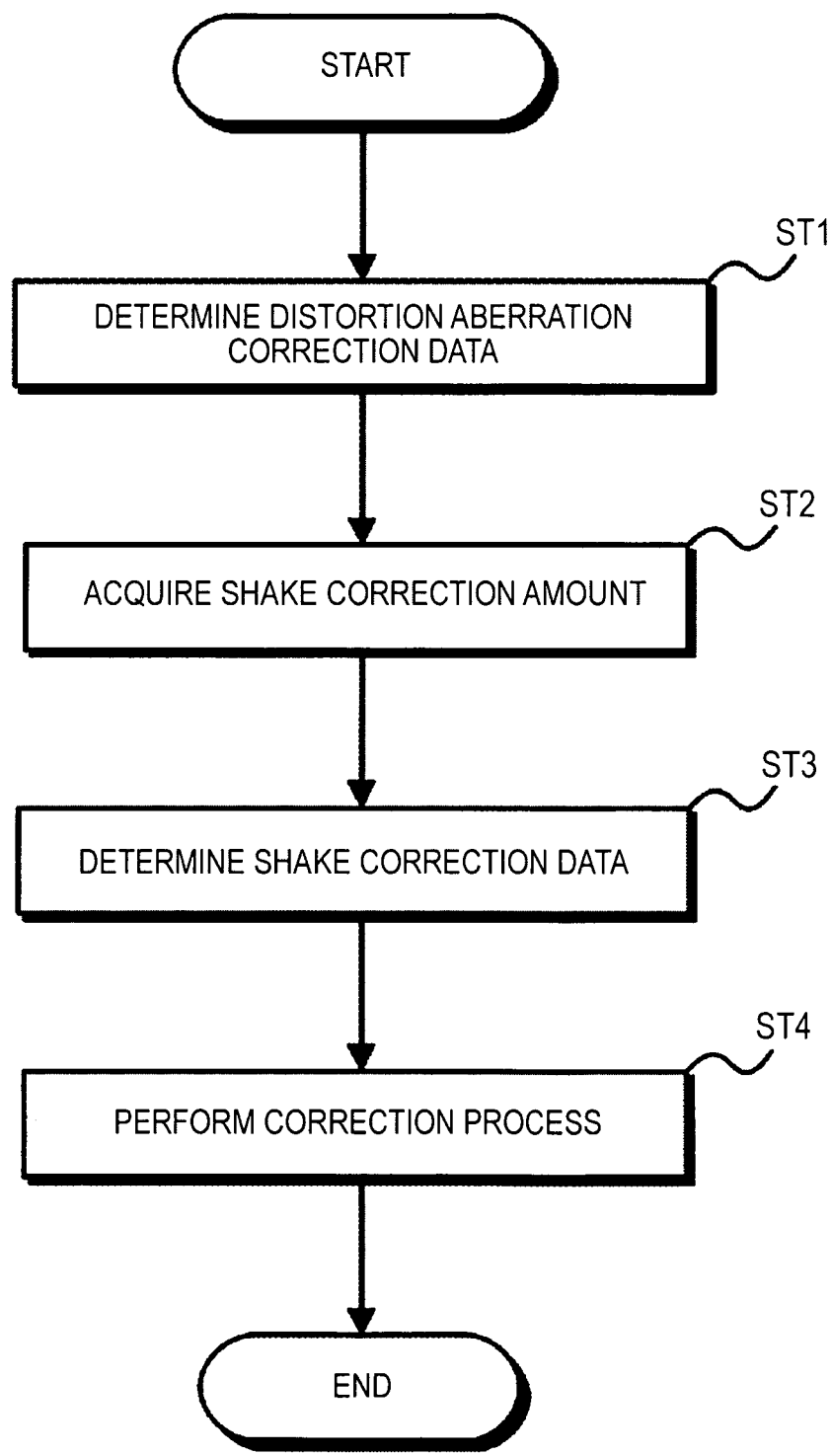
FIG. 10 is a flowchart representing the operation of a correction processing section.

FIG. 10 is a flowchart representing the operation of the correction processing section 137. In Step ST1, the correction processing section 137 determines distortion aberration correction data. The correction processing section 137, for example, in units of pixels corresponding to a predetermined interval, distortion aberration correction data (vector data) that is used for converting the coordinates before the correction of distortion aberration into the coordinates after the correction of distortion aberration is stored in advance as a table. In addition, the correction processing section 137 stores the table of the distortion aberration correction data for each zoom ratio. The correction processing section 137 determines the distortion aberration correction data of each pixel before correction by using the table of the distortion aberration correction data. The correction processing section 137 calculates distortion aberration correction data corresponding to a pixel for which the distortion aberration correction data is not stored by performing an interpolation process, for example, linear interpolation, by using the distortion aberration correction data of adjacent pixels. In addition, the correction processing section 137, for a zoom ratio for which the table is not stored, calculates a table corresponding to the zoom ratio for which the table is not stored by performing an interpolation process by using tables of zoom ratios for which the tables are stored.

In Step ST2, the correction processing section 137 acquires the shake correction amount. The correction processing section 137 acquires the shake correction amount from the control unit 18d and determines the movement amount or the rotation angle of the extraction area.

In Step ST3, the correction processing section 137 determines the shake correction data. The correction processing section 137 determines the shake correction data that is used for converting the coordinates after the correction of distortion aberration into the coordinates after the correction of the shake based on the shake correction amount determined in Step ST2.

In Step ST4, the correction processing section 137 performs a correction process by using the distortion aberration correction data and the shake correction data, and thereby the correction of the distortion aberration and the shake correction are simultaneously performed.

Figure 11A:
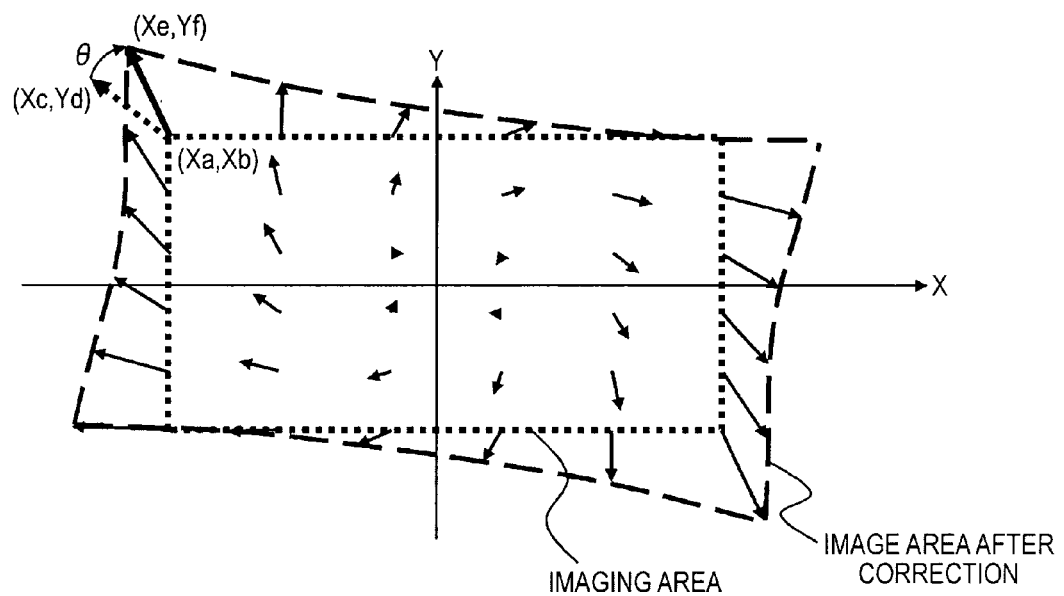
FIGS. 11A and 11B are diagrams illustrating an operation of the correction processing section.
Figure 11B:
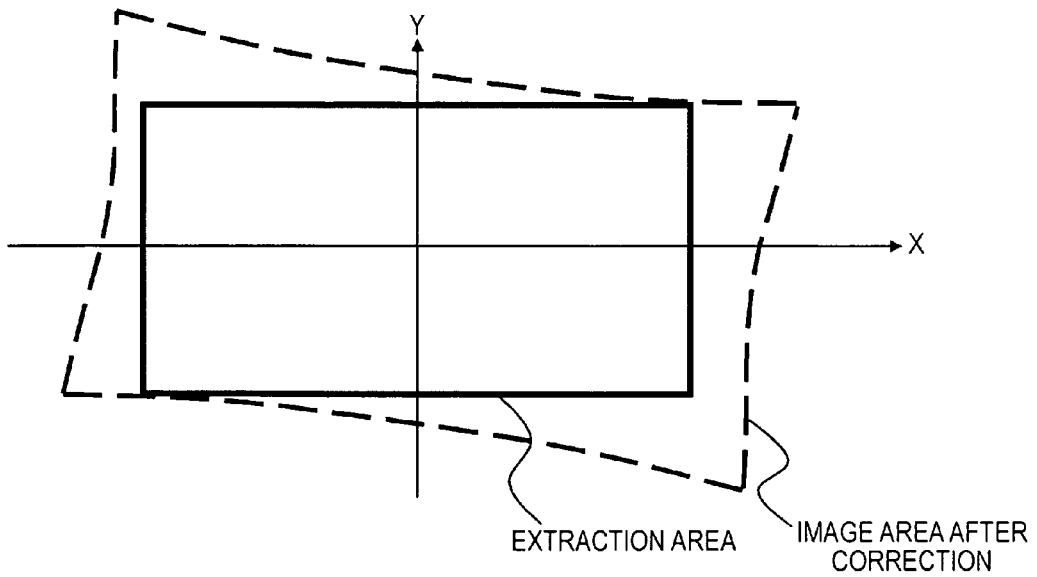

FIGS. 11A and 11B are diagrams illustrating the operation of the correction processing section 137. As shown in FIG. 11A, when the distortion aberration is corrected by using the distortion aberration correction data, the coordinates (Xa, Yb) of the image sensing area are converted into the coordinates (Xc, Yd). Thus, after the distortion aberration is corrected, the image sensing area becomes an image sensing area having a bobbin shape acquired by drawing out the four corners of the image from the center of the image to the outer side. In addition, when the distortion correction amount is a rotation angle θ, the coordinates (Xc, Yd) after the distortion aberration correction are converted into the coordinates (Xe, Yf) after the shake correction by performing calculation of Equation (1) by using the shake correction data.

$$\begin{pmatrix} Xe \\ Yf \end{pmatrix} = \underbrace{\begin{pmatrix} \cos\theta & \sin\theta \\ -\sin\theta & \cos\theta \end{pmatrix}}_{\text{shake correction data}} \begin{pmatrix} Xc \\ Yd \end{pmatrix} \quad (1)$$

As described above, by calculating using the distortion aberration correction data and the shake correction data, the coordinates (Xa, Yb) of the image sensing area are converted into the coordinates (Xe, Yf) by performing the correction of distortion aberration and the shake correction. Accordingly, by performing the coordinate conversion for an image signal output from the image processing section 131 by using the distortion aberration correction data and the shake correction data, an image that is acquired by moving the image after the correction of distortion aberration in accordance with the distortion correction amount can be obtained. In other words, the image sensing area is converted into an image sensing area acquired by rotating the image sensing area having a bobbin shape whose four corners are drawn out from the center of the image to the outer side about the center of the image by performing the correction of distortion aberration and rotating the image sensing area in accordance with the shake correction data.

Furthermore, as shown in FIG. 11B, an image signal representing an image of an extraction area is extracted from the image of the image area after correction by using the image sensing area as the extraction area and is output. Accordingly, the image signal output from the correction processing section 137 becomes an image signal that represents an image having a predetermined area size for which the distortion aberration correction and the correction of the shake of rotation of the optical axis are performed.

Figure 12A:
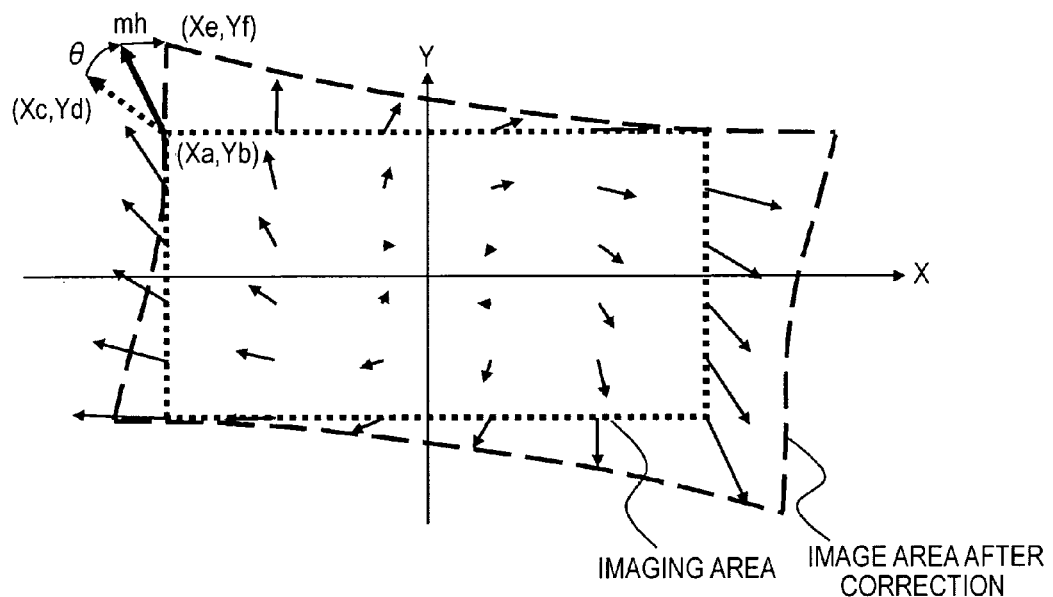
FIGS. 12A and 12B are diagrams illustrating another operation of the correction processing section.
Figure 12B:
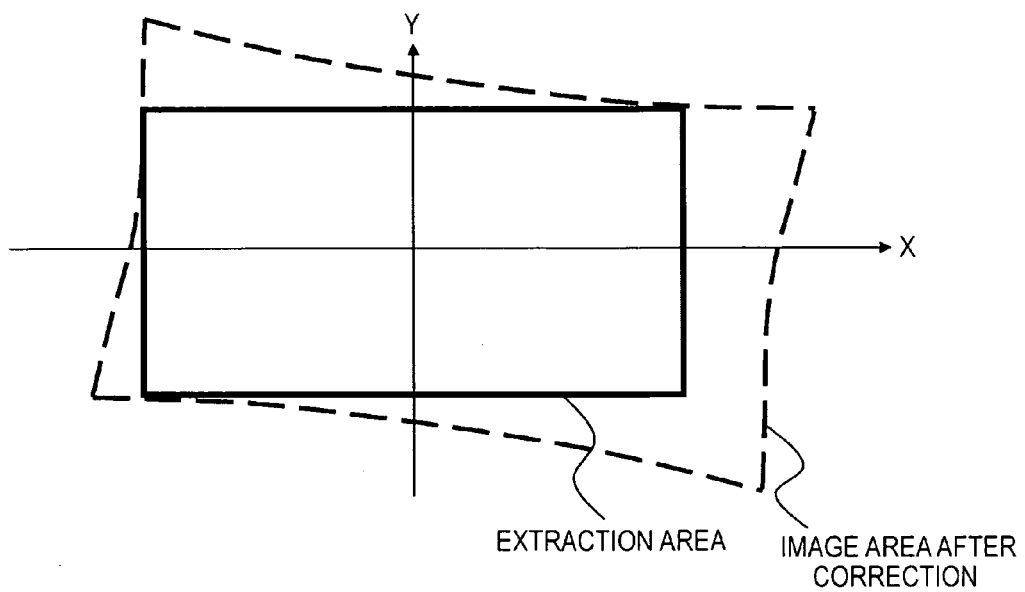
Figure 13A:
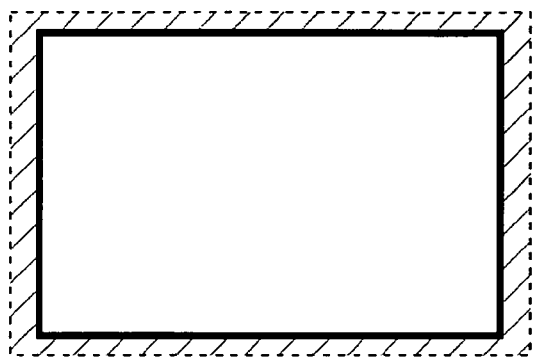
FIGS. 13A, 13B, and 13C are diagrams showing a shake correcting operation in related art.
Figure 13B:
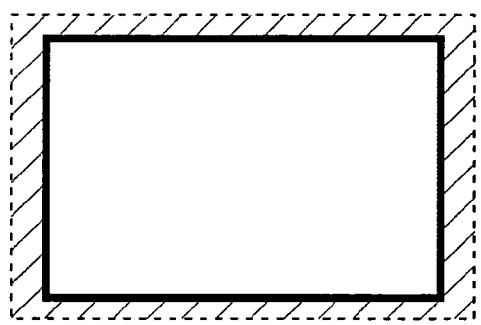
Figure 13C:
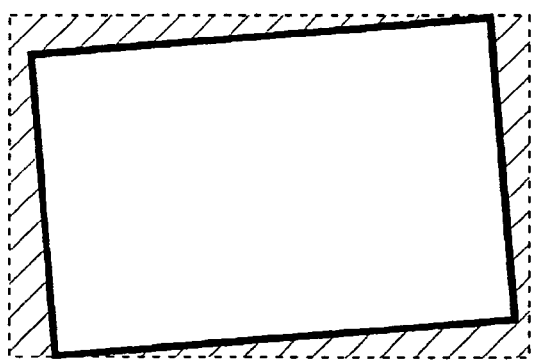

FIGS. 12A and 12B are diagrams illustrating another operation of the correction processing section 137. FIGS. 12A and 12B show a case where rotation about the optical axis and the shake in the pan direction are generated. As shown in FIG. 12A, the coordinates (Xa, Yb) of the image sensing area are converted into the coordinates (Xc, Yd) by performing correction of distortion aberration by using the distortion aberration correction data. When the shake correction amount is a rotation angle θ, the movement amount in the horizontal direction is "mh", and the movement amount in the vertical direction is "mv", the coordinates (Xc, Yd) after the correction of distortion aberration are further converted into the coordinates (Xe, Yf) after the shake correction by performing calculation of Equation (2) by using the distortion correction data. In FIG. 12, a case where "mv=0" is represented as an example.

$$\begin{pmatrix} Xe \\ Yf \end{pmatrix} = \frac{\begin{pmatrix} \cos\theta & \sin\theta \\ -\sin\theta & \cos\theta \end{pmatrix}}{\text{shake correction data}} \begin{pmatrix} Xc \\ Yd \end{pmatrix} + \frac{\begin{pmatrix} mh \\ mv \end{pmatrix}}{\text{shake correction data}} \quad (2)$$

As described above, the coordinates (Xa, Yb) of the image sensing area are converted into the coordinates (Xe, Yf) by performing the above-described calculation by using the distortion aberration correction data and the shake correction data. Accordingly, by performing coordinate conversion by using the distortion aberration correction data and the shake correction data for the image signal output from the image processing section 131, an image acquired by moving the image after the correction of distortion aberration in accordance with the shake correction amount can be obtained.

Furthermore, as shown in FIG. 12B, an image of an extraction area is extracted from the image of the image area after the correction by using the image sensing area as the extraction area and is output. Accordingly, the image signal output from the correction processing section 137 becomes an image signal that represents an image having a predetermined area size in which the distortion aberration and the shakes in the direction of the rotation of the optical axis and the pan direction are corrected.

As described above, when the coordinate conversion is performed by using the distortion aberration correction data and the shake correction data, an image signal in which the distortion aberration and the shake are corrected can be generated without generating the image signal after the correction of distortion aberration. Accordingly, a memory that stores the image signal in which the distortion aberration is corrected therein and the like may not need to be disposed, and thus the configuration of the imaging apparatus can be simplified. In addition, the shake in the rotation direction can be corrected without reducing the extraction area or using an imaging device having the image sensing area larger than the extraction area, and thereby the shake can be corrected by using the image sensing area of the imaging device effectively.

The present invention should not be construed as being limited to the above-described embodiments. The embodiments of the invention disclose the present invention in exemplary forms. Thus, it is apparent that the embodiments can be modified or changed by those skilled in the art within the scope of the present invention without departing from the basic concept. In other words, in order to determine the basic concept of the present invention, the appended claims should be referred to.

According to the imaging apparatus and the shake correcting method according to an embodiment of the present invention, an extraction area is moved for an image acquired by performing correction of distortion aberration generated by an imaging optical system and performing correction of distortion aberration in accordance with the shake correction amount for a picked up image that is obtained by performing photoelectric conversion of an optical image formed by an imaging optical system, and an image of the extraction area is extracted, and thereby an image signal of the image in which the shake is corrected is generated. As described above, by using the image in which the distortion aberration is corrected, the redundant area used for performing the shake correction can be increased. Accordingly, when the shake correction is performed by using the image in which the distortion aberration is corrected, the shake can be corrected without arranging a redundant area in the imaging device or arranging a large redundant area in the imaging device. Therefore, the shake can be corrected by effectively using the image sensing area of the imaging device. As a result, an embodiment of the present invention is very appropriate to an electronic apparatus having a function of generating a still frame or a moving picture.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging unit that generates an image signal of a picked up image by performing photoelectric conversion for an optical image formed by an imaging optical system, said imaging optical system having an optical axis;
    a shake detecting unit that detects a rotation shake about the optical axis;
    a correction amount setting unit that sets a shake correction angle based on the rotation shake detected by the shake detecting unit; and
    a correction processing unit that performs (i) correction of distortion aberration generated by the imaging optical system for the picked up image to obtain a corrected image having a bobbin shape, (ii) rotation of an extraction area within the corrected image in accordance with the shake correction angle after obtaining the corrected image with the bobbin shape, and (iii) extraction of an image of the extraction area after rotation of the extraction area,
    in which the bobbin shape has four corners which are drawn outward from a center of a corresponding image before correction of distortion aberration is performed such that an area of the bobbin shape is larger in all directions as compared to an area of the corresponding image before correction of distortion aberration is performed.

2. The imaging apparatus according to claim 1, wherein the correction processing unit performs correction of barrel distortion aberration that is generated by the imaging optical system.

3. The imaging apparatus according to claim 2, wherein the correction processing unit performs generation of an image signal of the image of the extraction area after rotation of the extraction area.

4. A shake correcting method for use with an imaging apparatus, said method comprising the steps of:
- detecting a rotation shake pertaining to the imaging apparatus by using a shake detecting unit;
- setting a shake correction angle based on the detected rotation shake by using a correction amount setting unit; and
- correcting distortion aberration that is generated by an imaging optical system for a picked up image to obtain a corrected image having a bobbin shape, rotating an extraction area within the corrected image in accordance with the shake correction angle after obtaining the corrected image with the bobbin shape, and extracting an image of the extraction area after rotation of the extraction area by using a correction processing unit,
- in which the bobbin shape has four corners which are drawn outward from a center of a corresponding image before correction of distortion aberration is performed such that an area of the bobbin shape is larger in all directions as compared to an area of the corresponding image before correction of distortion aberration is performed.

* * * * *